Figure 1:
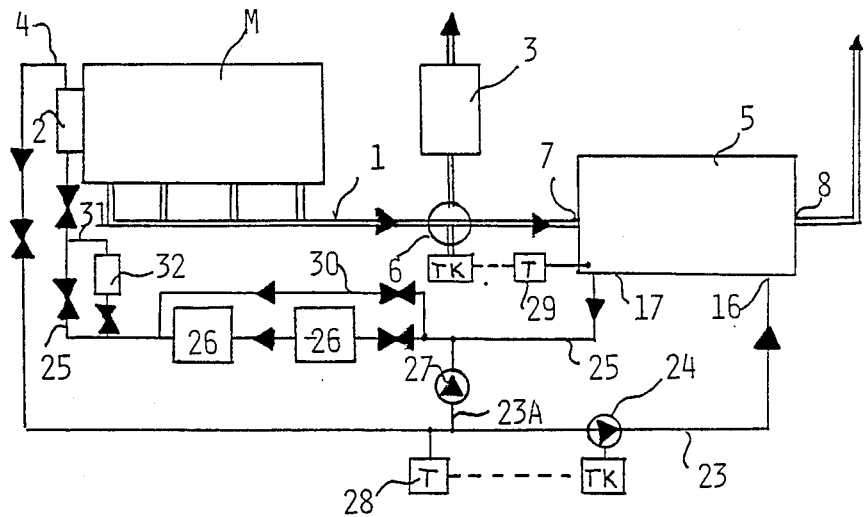

United States Patent [19]

Tóth et al.

[11] Patent Number: 4,958,766

[45] Date of Patent: Sep. 25, 1990

[54] APPLIANCE FOR HEATING MOTOR VEHICLES, MAINLY BUSES DRIVEN WITH INTERNAL COMBUSTION ENGINE

[75] Inventors: László P. Tóth; Endréné Kiss; Endre Pásztor; Gyóray Purebl; Ágoston Kórmendy; Gyula Mares; Géza E. Yos; Béla Horváth, all of Budapest, Hungary

[73] Assignees: Budapesti Muszaki Egytem; Mogurt Gepjarmu Kulkereskedelmi Vallalat; Ikarus Karosszeria es Jarmugyar, all of Hungary

[21] Appl. No.: 295,221

[22] Filed: Jan. 9, 1989

[51] Int. Cl.⁵ .............................................. B60H 1/02
[52] U.S. Cl. ........................... 237/12.3 B; 237/12.3 R
[58] Field of Search ............ 237/2 A, 12.3 R, 12.3 A, 237/12.3 B, 12.3 C, 44

[56] References Cited

U.S. PATENT DOCUMENTS 4,556,171 12/1985 Fukami et al. ................. 237/12.3 B Primary Examiner—Henry A. Bennet
Attorney, Agent, or Firm—Handal & Morofsky

[57] ABSTRACT

The invention relates to an appliance for heating motor vehicles, mainly buses driven with internal combustion engine, provided with heat accumulator in heat transfer connection with the exhaust pipe of the engine, and in given case with the space to be heated. The essential feature of the invention is that the heat accumulator (5) is directly connected with the extended coolant circuit of the engine (M)—and in case of additional heat extracting medium through the installation of heat exchanger (3), furthermore circulating pump (24) operated independently from the engine (M) is built into the extended coolant circuit.

14 Claims, 4 Drawing Sheets

APPLIANCE FOR HEATING MOTOR VEHICLES, MAINLY BUSES DRIVEN WITH INTERNAL COMBUSTION ENGINE

The invention relates to an appliance for heating motor vehicles, mainly buses with internal combustion engine.

As known, various types of heaters are used for heating the passenger space of motor vehicles, e.g. buses. These appliances utilize the heat of exhaust gases, or the engine's coolant for heating the passenger space and driver's cab. Such solutions are described in the Hungarian patent specification No. 169 772, or GER No. 2 829 454.

In further solutions, supplementary heating, or separate heat source, occasionally heat-accumulator is used to make heating of the passenger space independent from the engine.

Such heat accumulating heater is described for example in the Soviet authors certificate No. 761 309. This heater contains thermal pipes interconnected with the exhaust pipe and bodywork, and cell-like heat accumulator filled with heat-storing material, e.g. paraffine arranged between the thermal pipes. Purpose of the heat accumulator is to stabilize the heating characteristics of the passenger space when the engine is stopped for a short while, by utilizing the thermal energy of the medium heated previously in the heat accumulator.

Similar heat-storing heater is described in the U.S. Pat. No. 3,986,665. Here the heat accumulator is built into the heating system of the passenger space. When the exhaust gases are over a preset minimal temperature, the thermal energy of the exhaust gases is stored in the heat accumulator by way of absorption. The heat accumulator is surrounded by vacuum space for proper heat insulation. The vacuum is stopped by letting in heat transmitting fluid during discharge, thereby heating the air in the vehicle.

The common characteristic of these heat-storing heaters is that because of their construction, heat transfer and heat storing parameters they are capable for heating only for maximum 30–60 minutes when the engine is inoperative. Their construction is complicated and expensive, hence they generally not used in the practice.

The motor vehicle operators and designers are concerned for a long time in the problem to facilitate starting of the engines particularly during winter after being inoperative over a longer period. The known heater with or without heat accumulator are unsuitable for this purpose.

The present invention is aimed at elimination of above shortcomings with an improved heater for motor vehicles, mainly buses, which utilizes the exhaust gases more efficiently at a relatively lower cost, simple construction and small space demand. Further aim is that the heater according to the invention should afford the possibility for adequate preheating of the engine, and in given case the passenger space prior to starting, even if the engine has been inoperative for 8–10 hours.

Solution of the problem was based on the Soviet heater mentioned earlier, which has a heat accumulator interconnectible with the exhaust pipe and the space to be heated.

This was further developed by interconnecting the heat accumulator directly with the extended coolant circuit of the engine, or through heat exchanger when using additional heat extracting medium, where a circulating pump is built into the circuit, operated independently from the operating mode of the engine.

Practicable is the construction, where the inlet stub and outlet stub of the heat accumulator designed for the heat extracting medium are connected with the forward and return conduits forming extension of the coolant circuit, and fuel filter and/or at least one heater of the spaces to be heated are built into the return conduit.

Suitably, the inlet of the heat accumulator is connected with the exhaust pipe through reversing valve arranged between the exhaust pipe and silencer, preferably remote controlled by heat sensor of the heat accumulator.

In a specific case, a conduit interconnecting the return and forward conduits is built in between the outlet stub of the heat accumulator and the heater, fitted with check valve providing one-way flow.

According to a further characteristic of the invention such construction is also feasible, where a heat exchanger is connected between the forward and return conduits forming extension of the engine's coolant circuit, the inlet and outlet of which designed for the additional medium are connected through conduits with the inlet stub and outlet stub of the heat accumulator.

It is advisable to install a separate pump in the conduit connected with the inlet stub of the heat accumulator, controlled by heat sensor built into the forward conduit.

In a further preferred construction, the heat exchanger is connected between the forward and return conduits forming the extension of the engine's coolant circuit, the inlet of which designed for the additional medium is connected with outlet of the heat accumulator, while its outlet through conduit and another reversing valve built into the exhaust pipe can be connected with inlet of the heat accumulator, furthermore inlet stub and outlet stub of the heat accumulator are interconnected through conduits with the space to be heated, furthermore fan is built into the conduit connected with outlet of the heat exchanger and into the conduit returning from the passenger space to be heated to the heat accumulator.

The thermal pipes in the heat insulated house of the heat accumulator provided with inlet and outlet for one of the media and inlet stub and outlet stub for the other medium are parallel-and at least partly series connected, their central ducts are in heat transfer connection with one of the media (e.g. exhaust gases), on the other hand the external mantles with the other medium as heat extracting medium (e.g. coolant, oil, etc.) situated in the separated internal space.

The central ducts of the thermal pipes can be directly connected with the inlet and outlet of the heat accumulator, while the external mantles of the thermal pipes are situated in the space (e.g. coolant space) of the heat accumulator house provided with inlet and outlet stubs.

The inlet and outlet of the heat accumulator are preferably interconnected through additional heating pipes running along the heat accumulator. These are surrounded by the housing space provided with inlet and outlet stubs. The thermal pipes are arranged in the same space at a distance from the heating pipes. This way the hot exhaust gases are indirectly connected through heat transfer fluid with the thermal pipes whereby the thermal load of the latter ones is reduced.

The thermal pipes possess sealed internal space or spaces receiving suitably heat-storing material. Preferably heat accumulating latent material, e.g. bariumhydroxide can be used for this purpose.

Particularly effective heat transfer is attained with a thermal pipe having an outer pipe and within it one or several inner pipes between which is the heat accumulating material as charge. The inner mantle of the inner pipe or pipes surrounds the medium-guiding duct, while the outer mantle of the outer pipe appears as the other heat transfer surface. The inner pipe can be arranged coaxially, and in case of several inner pipes at the same distance from each other and from the outer pipe.

Figure 2:
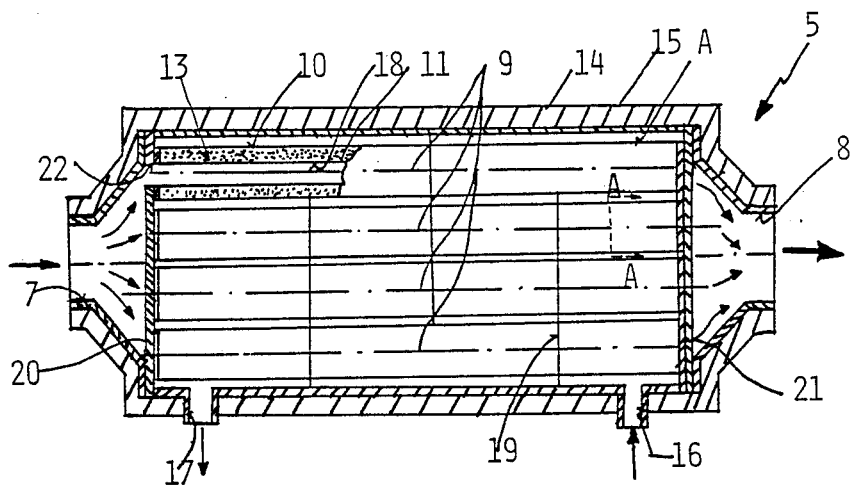
Figure 3:
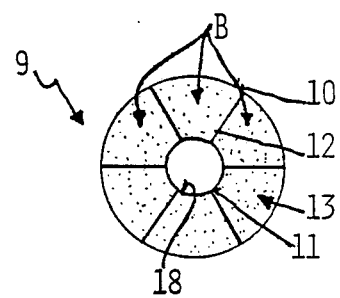
Figure 4:
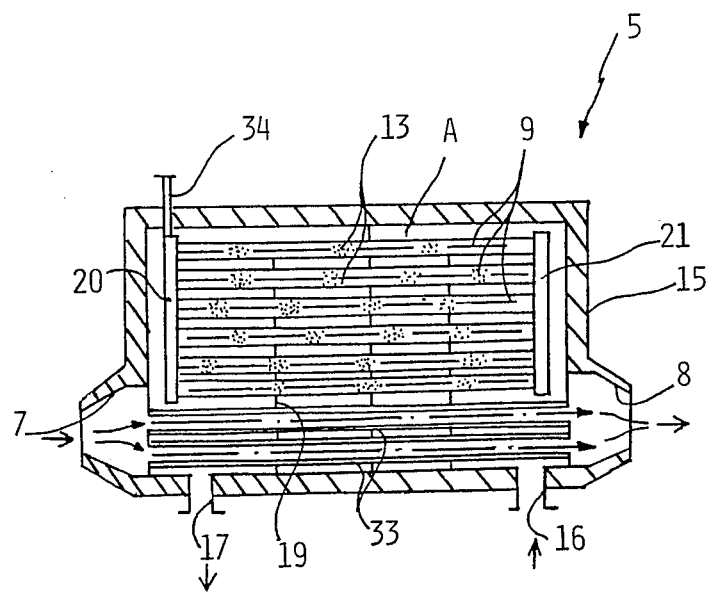
Figure 5:
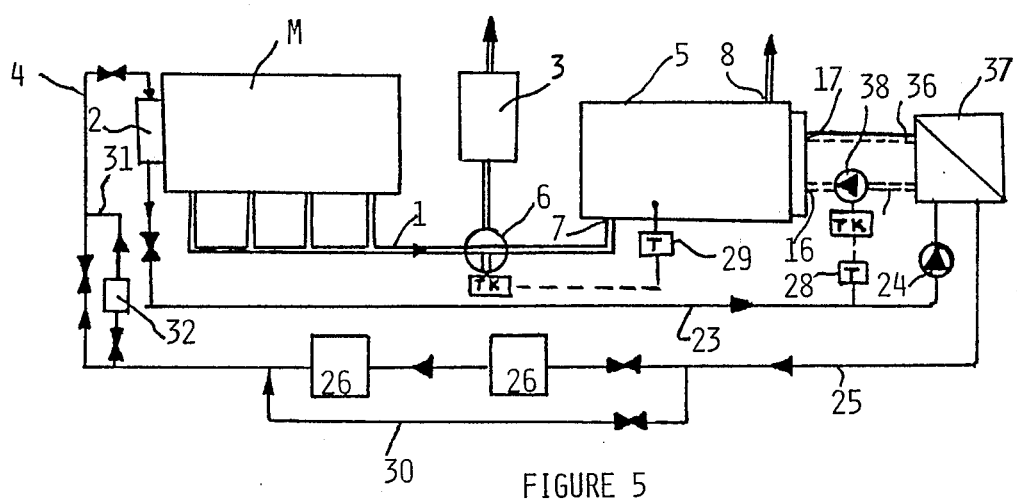
Figure 6:
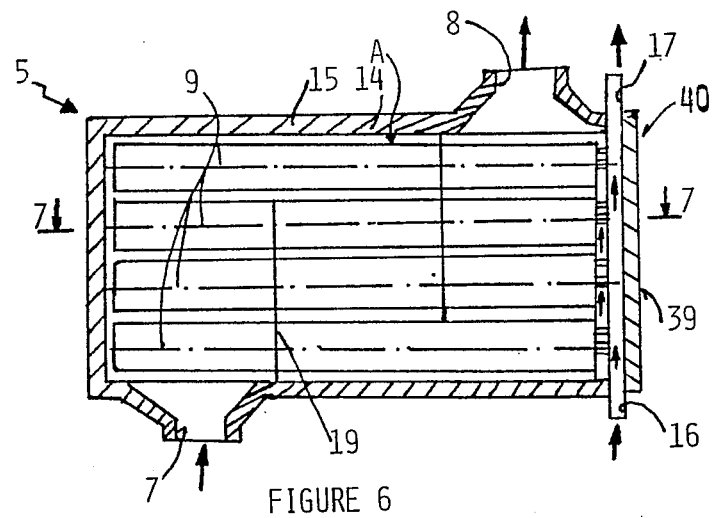
Figure 7:
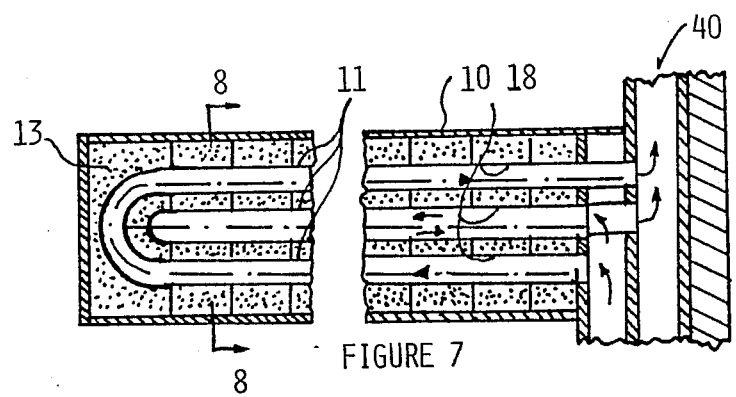
Figure 8:
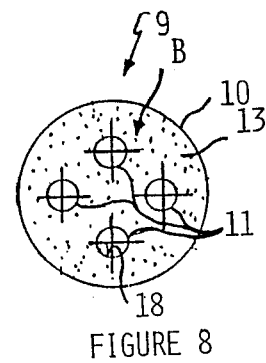
Figure 9:
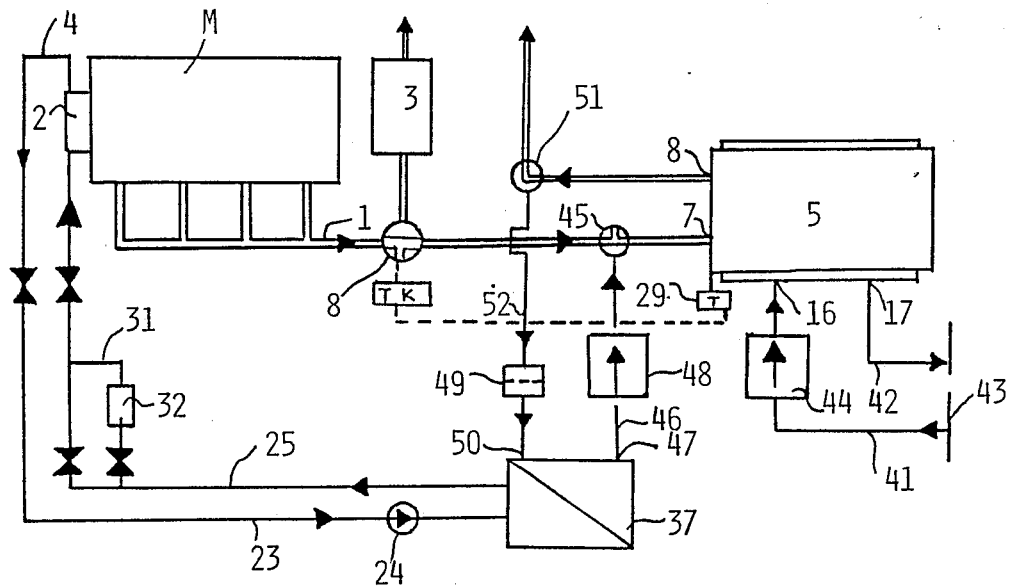
Figure 10:
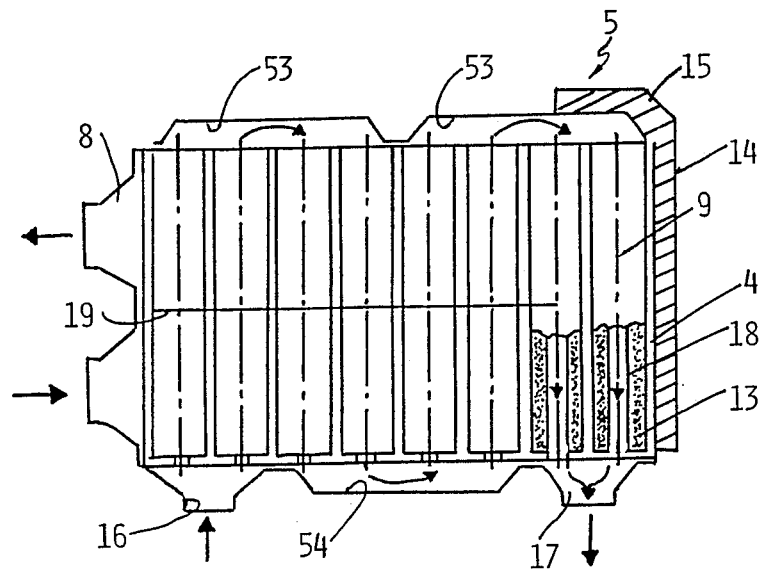

The invention is described in detail with the aid of the enclosed drawing showing some embodiments of the solution according to the invention by way of examples, in which:

FIG. 1.: Schematic connection diagram of the heat accumulating heater according to the invention applicable for buses;

FIG. 2.: Longitudinal section of the heat accumulator as detail of FIG. 1.;

FIG. 3.: Section along line A—A in FIG. 2. drawn to relatively larger scale;

FIG. 4.: Longitudinal section of the embodiment of heat accumulator according to FIG. 2., by way of example;

FIG. 5.: Connection diagram of the heat accumulating heater according to the invention by way of the second example;

FIG. 6.: Longitudinal section of the heat accumulator as detail of the solution according to FIG. 5. drawn to relatively larger scale;

FIG. 7.: Section along line VII—VII in FIG. 6. drawn to relatively larger scale;

FIG. 8.: Section along line VIII—VIII in FIG. 7;

FIG. 9.: Schematic connection diagram of the embodiment of the heater according to the invention by way of the third example;

FIG. 10.: Section of the heat exchanger of the heater according to FIG. 5., drawn to relatively larger scale, broken out in part.

Note: For the sake of better overall view, the similar details were marked with the same reference numbers.

FIG. 1–3. illustrate embodiment of the heater according to the invention by way of the first example. Exhaust pipe of the internal combustion engine M of a bus (not shown) is marked with 1, the coolant circulating pump with 2, and the silencer with 3. Radiator of the engine M is not shown separately, because operation of the heater according to the invention is completely independent from it.

According to the invention, the heat accumulator 5 is in connection with the extended coolant circuit 4 of engine M. In FIG. 1., the exhaust pipe 1 is connectible through reversing valve 6 with inlet 7 of heat accumulator 5, while the cool waste gases pass through outlet 8 into the open.

Details of heat accumulator 5 are shown by way of example in FIG. 2. and 3. In the present case, coolant of the engine appears as the heat extracting medium. As shown in FIG. 2., the heat accumulator 5 is provided with a set of thermal pipes 9. The sectional view of these thermal pipes 9 is presented by way of example in FIG. 3.

The thermal pipe 9 consists of concentrically arranged outer and inner pipes 10 and 11 interconnected by longitudinal and for example radial fins 12. Heat accumulating material 13 is situated in the spaces B between pipes 10 and 11 to be dealt with in detail further on.

House 14 of the heat accumulator 5 in the present case has an inlet 7 and outlet 8 for the exhaust gas, provided with heat insulating layer 15, furthermore with inlet stub 16 and outlet stub 17 for the other heat extracting medium. As shown in FIG. 2., inlet 7 and outlet 8 are interconnected through central duct 18 of the thermal pipes 9. The hot waste gases entering inlet 7 freely flow through ducts 18 towards outlet 8. The coolant of engine M as heat extracting medium enters through inlet stub 16 the space A of the heat accumulator 5 receiving thermal pipes 9, thus the coolant flows cross directionally along the external mantle as the heat transfer surface of outer pipe 10 of the thermal pipes 9, the flow is guided by baffle plates 19, then the coolant in space A leaves the heat accumulator 5 through outlet stub 17. The space A receiving the heat extracting medium is sealed on its two sides by end plates 20 and 21 which are provided with suitable holes 22 at the central ducts 18 of thermal pipes 9.

As shown in FIG. 1., the heater according to the invention has a forward conduit 23 as extension of the coolant circuit 4 connected with the inlet stub 16 of the heat accumulator 5. Pump 24 is built into conduit 23. The return conduit 25 is connected with outlet stub 17 of the heat accumulator 5, into which conventional heaters 26 are installed for heating the passenger space (not shown) of the vehicle. Conduit 23A is provided for interconnecting the conduits 23 and 25 with in-built check valve 27. Its purpose is to prevent recirculation of the heat extracting medium from the heat accumulator 5.

According to FIG. 1., a conventional heat sensor 28 (thermostat) is built into the forward conduit 23 being in control connection with drive of the pump 24. The heat accumulator 5 in the present case was fitted similarly with a heat sensor 29, which remote controls the reversing valve 6.

The return conduit 25 has a conduit 30 bridging over the heaters 26, through which the heaters 26 can be disengaged in given case from the extended coolant circuit 4. Furthermore by way of conduit 31 parallel connected with conduit 25, the fuel filter 32 of the Diesel-operated engine M was incorporated into the coolant circuit 4 for preheating. In given case, this too can be disengaged.

During operation of the engine M, the hot exhaust gases pass from the exhaust pipe 1 in the position of the reversing valve 6 according to FIG. 1. through inlet 7 into the heat accumulator 5. Flowing through central ducts 18 of the thermal pipes 9, they become heated together with the heat accumulating material 13. In the present case it is practicable to use latent material as heat accumulating material. The solid-liquid phase-changing temperature of which is a few degrees below 100° C. Under the effect of heat, this latent heat accumulating material 13 melts at above temperature and it is capable to accumulate the heat over a long time.

At the same time, i.e. during operation of the engine M, the pump 2 pushes the coolant through conduit 23A. check valve 27 and heaters 26, thereby heating the passenger space and the driver's cab.

Heat sensor 28 in the forward conduit 23 section before branching off the conduit 23A - senses the temperature of the circulated coolant. Upon reaching a preset lower limit value, the heat sensor 28 emits electric control signal for starting the pump 24. Then the pump 24 circulates the coolant as heat extracting medium through heat accumulator 5, and this way it serves as supplementary heat source for heating the passenger space and driver's cab, so that in this case coolant of higher temperature flows to heaters 26.

As soon as temperature of the coolant reaches a preset upper limit value in conduit 23. the heat sensor 28 stops the pump 24.

Purpose of the heat sensor 29 of heat accumulator 5 is to prevent it from overheating. For this reason, upon reaching a preset temperature, it emits control signal for change-over of the reversing valve 6, when the heat exchanger is disengaged from the waste gas circuit, and the hot exhaust gases pass from the exhaust pipe 1 directly into the silencer 3, and from there into the open.

In heat recovery operating mode (e.g. during winter, or after starting the engine inoperative over a longer period), the thermal energy previously stored in the heat accumulator 5, and preserved even after 5–10 hour off-time following stopping of the engine M is utilized by preheating the coolant of engine M, fuel filter 32 and in given case even the heaters 26 in the passenger space prior to starting of the engine M. This way considerably more favourable engine starting conditions are brought about.

For this preheating according to the invention, first the pump 24 is started, which circulates the coolant cooled meanwhile through space A of the heat accumulator 5, at the same time it is heated by the thermal energy preserved in thermal pipes 9. The preheated coolant is circulated by pump 24 through bridging over conduit 30 - or in given case through heaters 26 - fuel filter 32 and water space of engine M, whereby they are preheated.

In case of lower heat storage capacity it is advisable to preheat the engine M and fuel filter 32 only. After such preheating, the engine will be in a more favourable starting condition, and subsequently the passenger space can be heated up at a relatively faster rate.

In the course of the experiments, the heat storage capacity of the heat accumulator 5 and heat extracting and heat transfer ratios were selected suitably as to attain 15°–35° C. temperature rise by preheating the engine M for 5–25 minutes. It is noted however, that with knowledge of the invention, dimensioning of these structural units comes under the obligatory knowledge of the average specialist, thus this is not dealt with separately.

FIG. 4. illustrates a further preferred embodiment of the heat accumulator 5 given by way of example. This differs fundamentally from the former solution in that the hot exhaust gases entering the inlet 7 are not in direct contact with the thermal pipes 9 and the heat accumulating materials 13, but indirect heat transfer connection was brought about. This means, that heating pipes 33 running through the heat accumulator 5 were built in between the inlet 7 and outlet 8, through which the hot waste gases flow, while the outer heat transfer mantles are in contact with the heat extracting medium, i.e. in the present case, with the coolant entering the space A through inlet stub 16 and passing out through outlet stub 17. The thermal pipes 9 are arranged at a distance from the heating pipes 33 thus receiving the heat indirectly from the coolant.

Similarly latent material was selected by way of example for the heat accumulating material provided with separate inlet stub 34. Since the thermal load of the heat accumulating material 13 is reduced compared with the first embodiment, barium hydroxide-octahydrate was used as latent material, the phase-changing, i.e. melting temperature of which is about 78° C. according to the experiments. It melts at this temperature and capable for heat storage. During heat recovery this latent material at cooling temperature below 78° C. begins to crystallize (solidify) transferring heat at the same time to the heat extracting medium circulated around the thermal pipes 9.

Such embodiment of the heater according to the invention is presented in FIG. 5–8., where the heat is extracted by medium, e.g. oil from the heat accumulator 5. Here heat exchanger 37 of the medium—coolant is connected through conduits 35 and 36 with the heat accumulator 5 provided conventionally with inlet and outlet for the coolant conduits 23 and 25. It is noted that in given case the heat exchanger can be replaced with the engine's oil cooler.

Controlled delivery pump 38 is built into the conduit 35 connected with the inlet stub 16 of the heat accumulator 5, the drive of which is in controlled connection with heat sensor 28 of the forward conduit 23.

The only difference in the embodiment shown in FIG. 5. is that during operation of the engine M the pump 2 presses the coolant through the heat exchanger 32, and heaters 26 in the passenger space. The heat sensor 28 senses the existing temperature of the coolant in conduit 23 and starts the pump 38 at the temperature below the present lower limit value. The forced flow of the medium—oil in this case—is set off followed by heating of the coolant in the heat exchanger 37. The heat sensor 28 stops the pump 38 and thus the heat transfer ceases in the heat exchanger 37 as soon as the temperature of the coolant arriving from the engine M reaches a set upper limit value.

Thermal energy of the heat accumulator 5 is recovered by the simultaneous operation of pump 24 and 38. In this case, the coolant is heated by the medium, the heat exchanger 37 preheats the engine M, the fuel filter 32 and in given case the interior of the bus through heaters 26.

A further embodiment by way of example of the heat accumulator 5 according to the invention is shown in FIG. 6–8. According to FIG. 6., the thermal pipes 9 are arranged in space A, i.e. in the heat insulated 15 house 14 in cross direction to inlet 7 and outlet 8 of the exhaust gases. For the oil as medium, the heat accumulator 5 is provided with medium-inlet and distribution unit 39 at inlet stub 16. This unit carries the oil by series connection into the inner ducts 18 of thermal pipes 9, which extracts heat from the heat accumulating material 13 filled into the thermal pipes 9, then changing direction it leaves the thermal pipes 8 at the pipe end identical with the entry and passes out of the heat accumulator 5 through the medium-collecting unit 40 formed at the outlet stub 17. FIG. 6 and 7. clearly show how are the thermal pipes 9 and their ducts 18 series connected. FIG. 8, illustrates the sectional view of a thermal pipe 9. Here four inner pipes 11 are arranged within the outer pipe 10 at the same distance from each other and from the outer pipe 10. The heat accumulating material 13 is situated as a charge in space B between the inner pipes 11 and outer pipe 10. This may be a latent material the phase-changing temperature of which is over 100° C., but it is at least 100° C. lower than the average temperature of the exhaust gases passing out of the engine M.

The third embodiment of the heater according to the invention is shown by way of example in FIG. 9. and 10., to be used for instance in hot-air heated bus.

Air ducts 41 and 42 are connected with inlet stub 16 and outlet stub 17 of heat accumulator 5, the other ends of which are connected with the air ducts of the passenger space on the spot marked with 43 as shown in FIG. 9. The air duct 41 is provided with fan 44 pushing the air of the passenger space into the heat accumulator 5.

Similarly to the arrangement according to FIG. 5, a heat exchanger 37 is built into the extended coolant circuit 4, connected with the coolant conduits 23 and 25. In this case a reversing valve 45 is built into the pipe connected with inlet 7 of the heat accumulator 5 for the exhaust gases, and the reversing valve is connected through conduit 46 with outlet 47 of the heat exchanger 37. Fan 48 is built into conduit 46 capable to circulate the air as heat extracting medium in closed circuit between heat accumulator 5 and heat exchanger 37 (detailed further on). Air filter 49 is also provided for the removal of impurities present in the air circuit, built into duct 52 interconnecting the outlet 8 of heat accumulator 5 with inlet 50 of heat exchanger 37 via the receiving valve 51.

A suitable embodiment of the heat accumulator 5 according to FIG. 8 is shown in FIG. 10. As mentioned in the foregoing, here air was used as heat extracting medium.

The thermal pipes 9 are horizontally arranged in the house 14 heat insulated with coating 15 and their ducts 18 are series connected by way of upper and lower transfer ports 53 and 54. Otherwise, the thermal pipes 9 may be the same as the one shown in FIG. 3. It is advisable to select the melting temperature of the latent material used in thermal pipes 9 as heat accumulating material to be over 100° C.

During charging of the heat accumulator 5, the outer heat transfer surface of thermal pipes 9 is in contact with the hot waste gases, while in heat recovery operating mode it is in contact with air, used as medium. In the inner ducts 18 of the thermal pipes 9 always the air flows which is used for heating the passenger space and driver's cab.

Operating mode of the appliance according to FIG. 9 and 10 is the following:

During operation of the engine M, the hot exhaust gases in the position of reversing valves 6, 45 and 51 shown in FIG. 9, flow through the thermal pipes-receiving space A of heat accumulator 5. At the same time fan 45 pushes air through conduit 41 into the heat accumulator 5 a inlet stub 16.

The air heated in the heat accumulator 5—mixed with the necessary amount of ambient air—is let into the interior of the vehicle for heating the passenger space and driver's cab.

After 6-8 hour off-time of the engine M, the thermal energy stored in the heat accumulator 5 is utilized for preheating the engine. For this purpose air as heat extracting medium is flown on the heat accumulator 5 in the place of the exhaust gases, for which the reversing valves 6, 45 and 51 are set in the other operation position. In this case the reversing valves 45 and 51 stop the flow toward the exhaust pipe 1 and into the open respectively, as a result of which closed air circuit is brought about between the heat accumulator 5 and heat exchanger 37. In this closed circuit the air is circulated by fan 48.

Preheating of the engine M practically begins with the simultaneous starting of fan 48 and pump 24. During the period of heat recovery efficient heat extraction and heat transfer take place on the heat transfer surfaces of heat accumulator 5. This ensures the use of air—the heat transfer capacity of which is lower than that of liquids—as heat extracting medium according to the invention, and this way ensuring heat output required for preheating the engine M.

Proportion of the thermal energy recovered from the heat accumulator 5 used for preparing and heating engine M, fuel filter 32, or in given case the passenger space and driver's cab can be set according to the existing requirements by adjusting the air delivery of fans 44 and 48.

During heating the exhaust gases, while in heat recovery operating mode air as the medium enter the heat accumulator 5 through inlet 7, then flowing perpendicularly to thermal pipes 9 in the direction fixed by the horizontal baffle plates 19, finally leave the heat accumulator 5 through outlet 8.

The air used for heating the passenger space and driver's cab enters the heat accumulator 5 through inlet and distribution stub 16 flowing vertically through inner ducts 18 of thermal pipes 9. With proper series connection of the thermal pipes 9, the number of air ducts can be increased. The air is guided by reversion and transfer ports 53 and 54 between the ducts 18. The heated air leaves the heat accumulator 5 through outlet stub 17.

It is noted that during the charging process in the heat accumulator 5 the fan 44 produces higher overpressure in the inner ducts 18 of thermal pipes 9, than the overpressure of the exhaust gases flowing along the outer mantle of the thermal pipes 9. And this prevents the passage of exhaust gases as impurity into air system serving for heating the vehicle, for instance through possible leakage of the heater.

Main advantages of the heat accumulating heater according to the invention are the following:

Since exclusively waste thermal energy is used, i.e. no additional heating mechanisms are needed, the heater according to the invention realizes efficient energy-saving heating;

The heater according to the invention does not reduce the power of engine M, because the exhaust gases suffer pressure drop in the heat accumulator 5 instead of the silencer 3, and the insulated heat accumulator 5 takes over the role of the silencer;

Further considerable energy-saving is reached by preheating the coolant andd fuel filter 32 of the engine M prior to starting the engine, since running of the engine M for heating is unnecessary before departure of the vehicle. This represents considerable fuel-saving for the operators especially in winter season;

Preheating of the engine M according to the invention favourably influence the life span of the engine;

The facility of preheating the vehicle improves the driving safety and passenger's comfort;

During operation of the vehicle, e.g. bus, heat output independent from power of the engine M can be obtained for heating of the vehicle;

In given case, the thermal energy of the coolant and exhaust gases can be equally utilized;

The heater according to the invention requires relatively low expenditure and small space for installation.

It became evident from the foregoing that embodiments of the heat accumulator 5 shown by way of examples were double-pipe constructions of closed system. It is noted however, that any other suitable heat accumulator can be used with similar advantages, where only exhaust pipes are arranged in the water space. In case of such hot water and heat accumulator, separate electric heating cartridge can be provided for, extending into the tank of the hot water heat accumulator. For instance, after off-time over several days—when the heat accumulator 5 cools down completely—the bus can be heated with relatively low electric power, i.e. the heat accumulator can be charged with thermal energy in 2-3 hours with 1-2 kW electric power. With the so-charged heat accumulator the engine M can be preheated in 5-10 minutes to the required degree.

Finally it is mentioned, that besides coolant, air, oil and latent material, any other known suitable material can be used as heat extracting medium.

According to the experiences of the experiments conducted with latent materials, mainly such latent (based on solid-liquid phase-change) heat accumulating materials may come into question, the melting temperature of which is below 200° C., possessing high melting heat, but preserving their chemical stability even at 350° C. Further requirement is the good crystallization property, i.e. in the course of cooling process upon reaching the phase-changing temperature, th crystallization should begin and this to recover the stored heat in the required temperature range. Besides those mentioned earlier, the following can be used as such material: NaOH-KOH the melting temperature of which is 150° C., or $KNO_3$—$NaNO_2$—HTS with 142° C. melting temperature.

What we claim is:

1. An appliance for heating motor vehicles, mainly buses driven by an internal combustion engine, utilizing cooling water and exhaust gases of said engine as a heat source, said engine having a cooling circuit for circulation of the cooling water and a fuel filter, said appliance comprising:
   (a) a heat accumulator for accumulating heat energy of the exhaust gases and the cooling water, said heat accumulator being in heat transfer connection with an exhaust pipe of said engine, and being in connection with said cooling circuit of said engine; and
   (b) a pump for circulating said cooling water in an extended cooling circuit of said engine, said extended cooling circuit including said heat accumulator, said fuel filter and at least one heater of the vehicle, said pump being operated independently from said engine.

2. An appliance as claimed in claim 1, wherein an inlet stub and an outlet stub of said heat accumulator designed for the coolant water are connected with a forward conduit and a return conduit forming the extended cooling circuit, furthermore said fuel filter and/or at least one heater of the vehicle passenger space to be heated are built into the return conduit.

3. An appliance as claimed in claim 2, wherein an inlet of said heat accumulator designed for the exhaust gases is connected with the exhaust pipe through a reversing valve arranged between said exhaust pipe and a silencer, which is preferably in remote control connection with a heat sensor of said heat accumulator.

4. An appliance as claimed in claim 2, wherein a further conduit interconnecting said return conduit with said forward conduit is arranged between said outlet stub of said heat accumulator and said at least one heater and said further conduit is provided with a check valve.

5. An appliance as claimed in claim 2, wherein said heat accmulator further comprises a heat exchanger connected between said extended cooling circuit of said engine, the inlet and outlet of said heat exchanger being designed for an additional heat transfer medium connected through additional conduits with said inlet stub and said outlet stub of said heat accumulator, where a further pump is built into one of said additional conduits being in a controlled connection with a heat sensor of the forward conduit.

6. An appliance as claimed in claim 2 wherein said heat accumulator further comprises a heat exchanger connected between said forward conduit and said return conduit forming said extended cooling circuit of said engine, having an inlet of which, designed for an additional heat transfer medium, is connected through a reversing valve with the exhaust outlet of said heat accumulator, and having an outlet which, through a conduit and a further reversing valve built into the exhaust pipe, is connected with said inlet of the heat accumulator, furthermore said inlet stub and said outlet stub of said heat accumulator are interconnected through further conduits with the vehicle space to be heated, further comprising a fan in said conduit connected to said heat exchanger outlet and said conduit between said inlet stub and the vehicle space to be heated.

7. As appliance as claimed in claim 1, wherein said heat accumulator comprises thermal pipes parallel arranged at a distance from each other in a housing of said heat accumulator, said heat accumulator being provided with an insulating coating, an inlet and an outlet for exhaust gases, and an inlet stub, and an outlet stub for said cooling water, said thermal pipes having central ducts in heat transfer connection with the exhaust gases, while an outer mantle with the other medium is in heat transfer connection with said cooling water situated in a separate space of said housing.

8. An appliance as claimed in claim 7, wherein said central ducts of said thermal pipes are directly connected with said inlet and said outlet of said heat accumulator, while said outer mantle of said thermal pipes is connected with said space of said housing, said space being interconnected with said inlet stub and said outlet stub.

9. An appliance as claimed in claim 2, wherein said inlet and said outlet of said heat accumulator are interconnected by at least one heating pipe surrounded by a space of the house within a housing interconnected with said inlet stub and said outlet stub, and furthermore thermal pipes in said space are arranged at a distance from said heating pipe.

10. An appliance as claimed in claim 7, wherein said thermal pipes are provided with at least one separate internal space containing heat accumulating material.

11. An appliance as claimed in claim 10, wherein said thermal pipes each have an outer pipe forming an external heat surface and at least one inner pipe having an internal heat transfer service arranged within said outer pipe, between which is situated said internal space receiving said heat accumulating material, wherein said internal heat transfer surface of said inner pipe forms said central duct.

12. An appliance as claimed in claim 11, wherein said inner pipe is coaxially arranged in said outer pipe and they are interconnected by longitudinal fins, thereby forming several spaces receiving heat accumulating material.

13. An appliance as claimed in claim 11, wherein a plurality of inner pipes are arranged within said outer pipe spaced from each other and said outer pipe.

14. An appliance as claimed in claim 1, further comprising a heat exchanger built in said extended cooling circuit and being in heat transfer connection with said heat accumulator through an additional heat extracting medium.

* * * * *